(12) United States Patent
Shimizu et al.

(10) Patent No.: US 10,093,305 B2
(45) Date of Patent: Oct. 9, 2018

(54) TRAVEL DRIVING APPARATUS OF VEHICLE

(71) Applicant: MITSUBISHI JIDOSHA KOGYO KABUSHIKI KAISHA, Tokyo (JP)

(72) Inventors: Ryo Shimizu, Tokyo (JP); Norihiko Ikoma, Tokyo (JP); Makoto Kamachi, Tokyo (JP); Hironori Abe, Tokyo (JP); Naoki Miyamoto, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/463,347

(22) Filed: Mar. 20, 2017

(65) Prior Publication Data
US 2017/0282897 A1    Oct. 5, 2017

(30) Foreign Application Priority Data

Mar. 30, 2016 (JP) .................. 2016-068411

(51) Int. Cl.
*B60W 20/14* (2016.01)
*B60W 10/30* (2006.01)
(Continued)

(52) U.S. Cl.
CPC .............. *B60W 20/14* (2016.01); *B60K 1/02* (2013.01); *B60K 6/26* (2013.01); *B60K 6/442* (2013.01); *B60K 6/448* (2013.01); *B60K 6/52* (2013.01); *B60W 10/06* (2013.01); *B60W 10/08* (2013.01); *B60W 30/18127* (2013.01); *B60L 2210/14* (2013.01); *B60L 2240/525* (2013.01);
(Continued)

(58) Field of Classification Search
CPC ......... B60W 20/14; B60W 10/30; B60K 6/44; B60K 6/445; B60K 6/46; H02J 7/0091; B60L 3/0015; H02P 9/00
See application file for complete search history.

(56) References Cited

U.S. PATENT DOCUMENTS

| 2,648,783 | A | * | 8/1953 | Clark | ........................ | H02P 9/00 |
| | | | | | | 290/30 R |
| 6,362,535 | B1 | * | 3/2002 | Tilyou | ..................... | B60K 6/46 |
| | | | | | | 290/40 C |

(Continued)

FOREIGN PATENT DOCUMENTS

| JP | 2007-325352 A | 12/2007 |
| JP | 2013-6443 A | 1/2013 |

(Continued)

*Primary Examiner* — Yuri Kan
(74) *Attorney, Agent, or Firm* — Birch, Stewart, Kolasch & Birch, LLP

(57) ABSTRACT

In a hybrid vehicle including a front motor for driving front wheels, and a step-up converter for stepping up voltage from a battery to supply power to the front motor, in which power regenerated by rotational force of the front wheel during vehicle deceleration is stepped down by a step-up converter and can be supplied to a battery, the hybrid vehicle includes a hybrid control unit which computes maximum input power of the step-up converter and regenerated power of the front motor during vehicle deceleration, and sets a difference obtained by subtracting regenerated power of the front motor from the maximum input power of the step-up converter to the maximum generated power of the generator.

9 Claims, 5 Drawing Sheets

(51) Int. Cl.
  *H02P 9/00* (2006.01)
  *B60K 6/26* (2007.10)
  *B60W 10/06* (2006.01)
  *B60W 10/08* (2006.01)
  *B60K 1/02* (2006.01)
  *B60K 6/442* (2007.10)
  *B60K 6/448* (2007.10)
  *B60K 6/52* (2007.10)
  *B60W 30/18* (2012.01)

(52) U.S. Cl.
  CPC .... *B60L 2260/28* (2013.01); *B60W 2510/087* (2013.01); *B60W 2710/0644* (2013.01); *B60W 2710/083* (2013.01); *B60W 2710/086* (2013.01); *B60W 2720/403* (2013.01); *B60Y 2200/92* (2013.01); *B60Y 2300/18125* (2013.01); *B60Y 2300/43* (2013.01); *B60Y 2300/91* (2013.01); *Y10S 903/906* (2013.01); *Y10S 903/93* (2013.01)

(56) References Cited

U.S. PATENT DOCUMENTS

| | | | | |
|---|---|---|---|---|
| 2004/0070270 | A1* | 4/2004 | Gunji | B60K 6/44 303/152 |
| 2009/0173555 | A1* | 7/2009 | Okamura | B60K 6/46 180/65.22 |
| 2012/0304622 | A1* | 12/2012 | Verbrugge | B60W 10/30 60/274 |
| 2016/0114788 | A1* | 4/2016 | Kamatani | B60K 6/445 701/22 |
| 2016/0167519 | A1* | 6/2016 | Luke | B60L 3/0015 701/22 |
| 2016/0257293 | A1* | 9/2016 | Takahashi | H02J 7/0091 |

FOREIGN PATENT DOCUMENTS

| | | |
|---|---|---|
| JP | 2014-125053 A | 7/2014 |
| WO | WO 2007/088725 A1 | 8/2007 |

* cited by examiner

TRAVEL DRIVING APPARATUS OF VEHICLE

BACKGROUND OF THE INVENTION

Field of the Invention

The present invention relates to control of travel driving of a vehicle.

Description of the Related Art

In hybrid vehicles which have been recently developed, there is known a vehicle which can operate in a traveling mode in which driving wheels for travelling are driven by an electric motor while power is generated by a generator driven by an internal combustion engine (series mode).

Moreover, many of vehicles which are provided with an electric motor for travel driving are configured to be capable of regenerative braking in which the electric motor generates power as well as brakes the vehicle during vehicle deceleration due to turning off of the accelerator, etc. so that power generated by regenerative braking can be charged to an onboard battery. Further, regenerative braking can apply braking to the vehicle like engine braking.

Further, there is also proposed a vehicle including a transformer for stepping up and down voltage, in which voltage outputted from an onboard battery is stepped up by the transformer to drive an electric motor.

For example, Japanese Patent Laid-Open No. 2007-325352 discloses a vehicle including an electrically powered front motor for driving the front wheels and a rear motor for driving the rear wheels. In the concerned vehicle, the front motor is driven by voltage which is outputted from an on-board battery and stepped up by a transformer. Power generated by the generator can be supplied to the front motor. Further, by stepping down the voltage of the power generated by the generator with the transformer, it becomes possible to supply power to the rear motor and charge the battery.

In a vehicle which is capable of series mode operation and regenerative braking as described above, the electric motor generates power through regenerative braking, for example, when the accelerator is turned off from on during the series mode.

Further, there is also a vehicle in which control is performed to increase generated power by the generator such that the engine rotational speed is decreased as power required for travel driving decreases when the accelerator is turned off from on in the series mode.

However, there are upper limit values for input and output power for the transformer as described above in view of protecting components from generated heat or the like. In a vehicle which is equipped with a transformer and capable of regenerative braking as described above, generated power may be outputted from the generator in such a case when the engine rotational speed is decreased as described above when the accelerator is turned off from on during the series mode to decelerate the vehicle so that generated power by the electric motor and generated power by the generator are inputted to the transformer. Therefore, there is a risk that power inputted to the transformer exceeds its upper limit value during vehicle deceleration. Where, a problem exists in that suppressing regenerative braking so as not to allow power exceeding the upper limit value to be inputted to the transformer causes occurrence of idle travelling feeling and deterioration of travelling stability.

SUMMARY OF THE INVENTION

Accordingly, it is an objective of the present invention to provide a travel driving apparatus of a vehicle, which can protect a transformer while ensuring regenerative braking torque not less than a predetermined level during vehicle deceleration in a hybrid vehicle which is provided with a transformer and capable of regenerative braking.

To achieve the above described objective, the travel driving apparatus for a vehicle of the present invention includes: a transformer of which maximum input/output power is changed based on a temperature condition; a first electrical motor for regenerating power by rotational force of either one of a front wheel and a rear wheel of the vehicle, and causing the power to be transformed by the transformer and to be supplied to a battery; and a generator for generating power by being driven by an internal combustion engine and causing the power to be transformed by the transformer and to be supplied to the battery, wherein the travel driving apparatus of a vehicle includes a first calculating section for calculating regenerated power of the first electrical motor such that regenerative braking torque not less than a predetermined level is exerted at the either one of the wheels of the vehicle, and a second calculating section for calculating generated power of the generator, wherein the second calculating section sets a difference obtained by subtracting the regenerated power calculated at the first calculating section from the maximum input/output power of the transformer as maximum generated power of the generator.

As a result of this, since in the travel driving apparatus of a vehicle according to the present invention, the difference obtained by subtracting the regenerated power of the first electrical motor from the maximum input/output power of the transformer to maximum generated power of the generator, it is possible to prevent the maximum input/output power from being exceeded during vehicle deceleration when the regenerated power of the first electrical motor and the generated power of the generator are inputted to the transformer, thus protecting the transformer. Moreover, since the regenerated power of the first electrical motor is calculated such that regenerated braking torque not less than a predetermined level is exerted at wheels, it is possible to suppress idle travelling feeling of vehicle during deceleration, and improve travelling stability.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

Hereinafter, embodiments of the present invention will be described with reference to the drawings.

Figure 1:
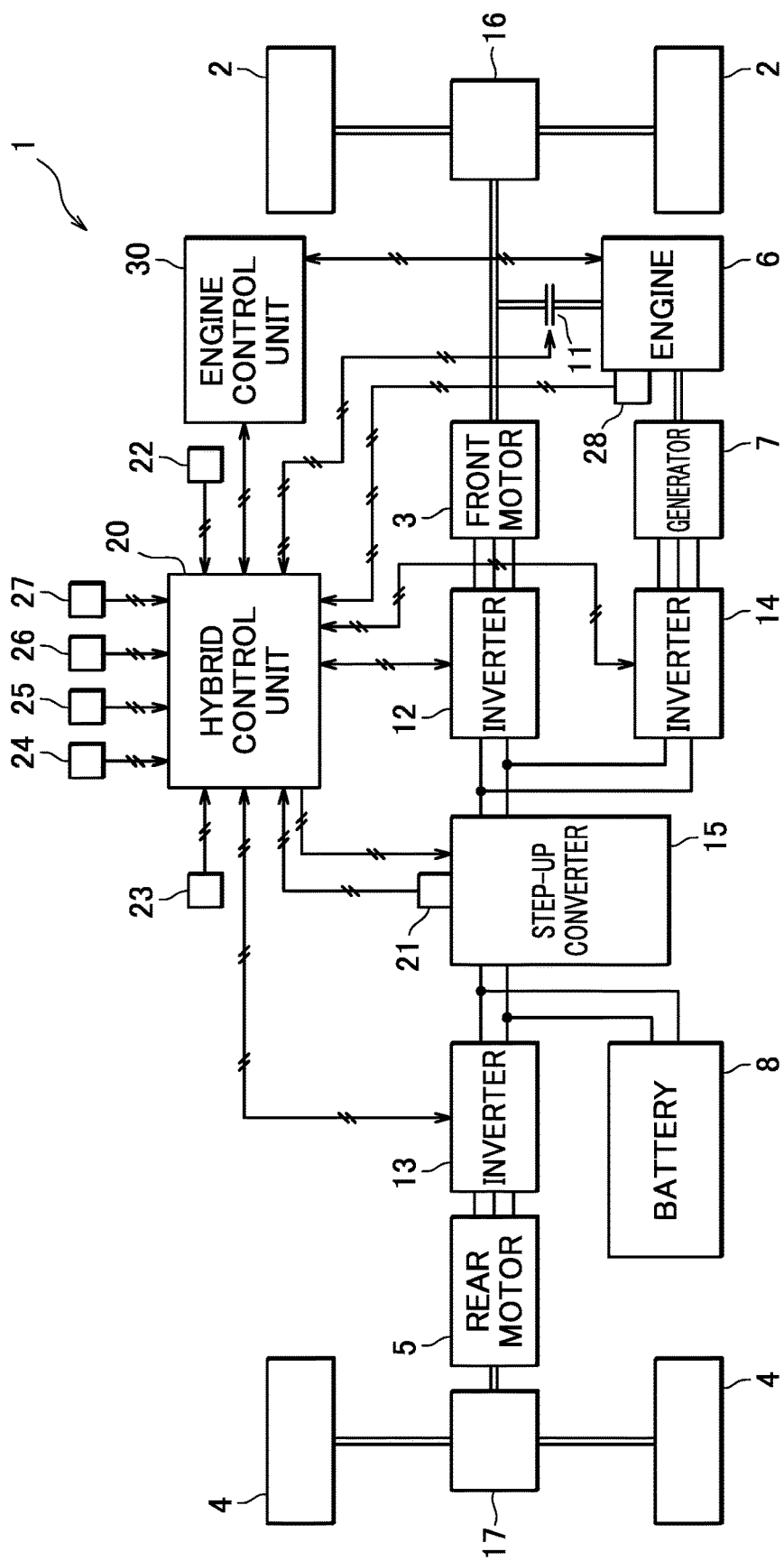
FIG. 1 is a schematic configuration diagram of a travel driving apparatus of a vehicle according to one embodiment of the present invention.

FIG. 1 is a schematic configuration diagram of a travel driving apparatus 1 of a vehicle according to one embodiment of the present invention.

As shown in FIG. 1, a vehicle equipped with the travel driving apparatus 1 of one embodiment of the present invention is a four-wheel drive hybrid vehicle, which is provided with an electrically driven front motor 3 (first electrical motor) for driving front wheels 2, an electrically driven rear motor 5 (second electrical motor) for driving rear wheels 4, an engine 6 (internal combustion engine), a generator 7, and a battery 8.

The engine 6 can drive the front wheels 2 via a front trans-axle 16 and drive the generator 7 to generate power. Moreover, the engine 6 and the front wheels 2 are connected such that power can be transferred therebetween via a clutch 11.

Moreover, the vehicle is provided with an inverter 12 for controlling power supply to the front motor 3, an inverter 13 for controlling power supply to the rear motor 5, and an inverter 14 for controlling output of the generator 7.

The travel driving apparatus 1 of the present embodiment includes a step-up converter 15 (transformer) which steps up the voltage of the battery 8 and supplies high voltage power to the front motor 3, and at the same time steps down the high voltage power generated by the generator 7 to supply it to the battery 8 and the rear motor 5.

The front motor 3, which can be driven by being supplied with power from the battery 8 via the step-up converter 15 and the inverter 12, and also can be driven by being supplied with power from the generator 7 via the inverter 14 and the inverter 12, drives the front wheels 2 via the front trans-axle 16.

The rear motor 5, which is driven by being supplied with power from the battery 8 via the inverter 13, drives the rear wheel 4 via a rear trans-axle 17.

The power generated by the generator 7 and outputted from the inverter 14 allows charging of the battery 8 via the step-up converter 15, and can also be supplied to the front motor 3 via the inverter 12 and to the rear motor 5 via the step-up converter 15 and the inverter 13, respectively.

Moreover, the generator 7, which is driven by being supplied with power from the battery 8 via the step-up converter 15 and the inverter 14, has a function as a starter motor for starting the engine 6.

The battery 8, which is made up of a secondary cell battery such as a lithium-ion battery, has a battery module not shown and made up of a plurality of battery cells brought together.

Operation of each of the inverter 12, the inverter 13, the inverter 14, and the step-up converter 15 is controlled by a control signal from a hybrid control unit 20 (computing section, a first calculating section, and a second calculating section) mounted on the vehicle.

The step-up converter 15 is provided with a temperature sensor 21 for detecting the temperature of a component (element, etc.) of the step-up converter 15.

Moreover, the vehicle is equipped with a front-wheel rotational frequency sensor 22 or a front-motor rotational frequency sensor (resolver) for detecting the number of rotations per unit time of the front wheel 2, a rear-wheel rotational frequency sensor 23 or a rear-motor rotational frequency sensor (resolver) for detecting the number of rotations per unit time of the rear wheel 4, an accelerator sensor 24 for detecting an accelerator depression amount, a brake sensor 25 for detecting a brake depression amount, a G sensor 26 for detecting longitudinal acceleration and lateral acceleration of the vehicle, a steering angle sensor 27 for detecting a steering control angle (steering angle), an engine rotational speed sensor 28 (detecting section) or a generator rotational frequency sensor (resolver) for detecting rotational speed of the engine 6, and an engine control unit 30 for controlling driving of the engine 6.

The engine control unit 30 controls the driving of the engine 6 based on a control signal from the hybrid control unit 20.

The hybrid control unit 20, which is a control apparatus for performing comprehensive control of the vehicle, is configured to include an input/output apparatus, a storage apparatus (ROM, RAM, non-volatile RAM, etc.), a central processing unit (CPU), and a timer, etc.

The input side of the hybrid control unit 20 is connected with each of the inverters 12 to 14, the engine control unit 30, the temperature sensor 21, the front-wheel rotational frequency sensor 22, the rear-wheel rotational frequency sensor 23, the accelerator sensor 24, the brake sensor 25, the G sensor 26, the steering angle sensor 27, and the engine rotational speed sensor 28, and is inputted with detection and operation information from these equipment.

On the other hand, the output side of the hybrid control unit 20 is connected with each of the inverters 12 to 14, the engine control unit 30, and the clutch 11.

Then, the hybrid control unit 20 transmits a control signal to the engine control unit 30, each of the inverters 13 and 14, and the clutch 11 to control the switching of the traveling mode (EV mode, series mode, and parallel mode) which involves engagement and disengagement of the clutch 11, output torques of the engine 6, the front motor 3 and the rear motor 5, and generated power and output torque of the generator 7 based on various detection amounts such as accelerator depression amount from the accelerator sensor 24 of the vehicle, and various operation information.

In the parallel mode, the front wheels 2 are mechanically driven by the output of the engine 6 with the clutch 11 being engaged, and are also driven to travel by the front motor 3 or the rear motor 5.

In the EV mode and the series mode, the clutch 11 is disengaged. In the EV mode, the engine 6 is stopped, and the front motor 3 and the rear motor 5 are driven by power from the battery 8. In the series mode, the engine 6 is operated to cause the generator 7 to generate power, thereby supplying power to and driving the front motor 3 and the rear motor 5.

Moreover, the vehicle of the present embodiment is configured to be capable of regenerative braking in which the front motor 3 and the rear motor 5 are forcibly driven to generate (regenerate) power as well as to apply braking force to the front wheels 2 and the rear wheels 4 during vehicle deceleration. The hybrid control unit 20 has a function of respectively controlling the amounts of power generated through the forcible driving of the front motor 3 and the rear motor 5 via the inverters 12, 13 during vehicle deceleration, thereby independently controlling the regenerative braking forces (regenerative torques) of the front wheels 2 and the rear wheels 4.

Figure 2:
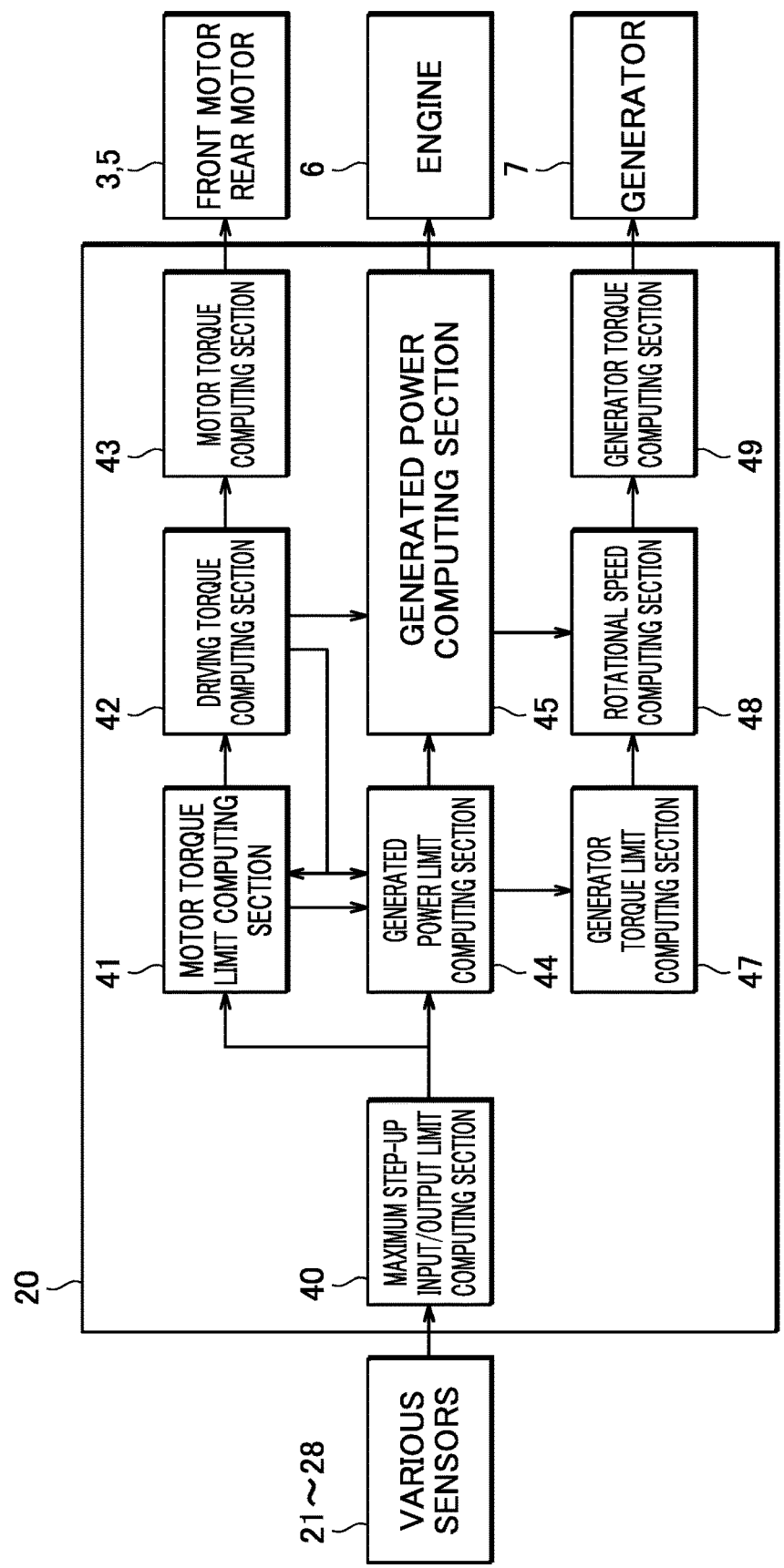
FIG. 2 is a block diagram to show a configuration of a driving control apparatus according to the present embodiment.

FIG. 2 is a block diagram to show the configuration of a driving control apparatus of the present embodiment.

As shown in FIG. 2, the hybrid control unit 20 includes a maximum step-up input/output limit computing section 40, a motor torque limit computing section 41, a driving torque computing section 42, a motor torque computing section 43, a generated power limit computing section 44, a generated power computing section 45, a generator torque limit computing section 47, a rotational speed computing section 48 (setting section), and a generator torque computing section 49.

The maximum step-up input/output limit computing section 40 computes a step-up converter upper-limit power Pvmax, which is a maximum value of the input/output power of the step-up converter 15, based on the temperature of the step-up converter 15.

The motor torque limit computing section 41 computes motor maximum torques, which are upper limit values of the motor torques (driving torques and regenerative torques of the front motor 3 and the rear motor 5), respectively.

The driving torque computing section 42 computes driving torque of the entire vehicle (user-requested driving torque Tur).

The motor torque computing section 43 computes motor torques Tmf, Tmr of the front motor 3 and the rear motor 5. Then, based on these motor torques Tmf, Tmr, it controls the operation of the front motor 3 and the rear motor 5 via the inverters 12, 13.

The generated power limit computing section 44 computes a maximum value of the generated power of the generator 7 (engine generated upper-limit power Pemax).

The generated power computing section 45 computes engine power output Pe which is not more than the engine generated upper-limit power Pemax computed at the generated power limit computing section 44 and is the generated power by the generator 7 which is needed corresponding to the user-requested driving torque Tur. Then, operation of the engine 6 is controlled via the engine control unit 30 such that generation of the engine power output Pe is made possible at the generator 7.

The generator torque limit computing section 47 computes a limiting value of the generator torque Tg (generator maximum regenerative torque Tgmax).

The rotational speed computing section 48 computes a rotational speed of the generator 7 corresponding to the engine power output Pe.

The generator torque computing section 49 computes a generator torque Tg for achieving the rotational speed of the generator 7 which is computed at the rotational speed computing section 48. Then, based on the generator torque Tg, it controls the generator 7 via the inverter 14.

Next, driving control by the travel driving apparatus 1 of the present embodiment will be described in detail by using FIGS. 3 and 4.

Figure 3:
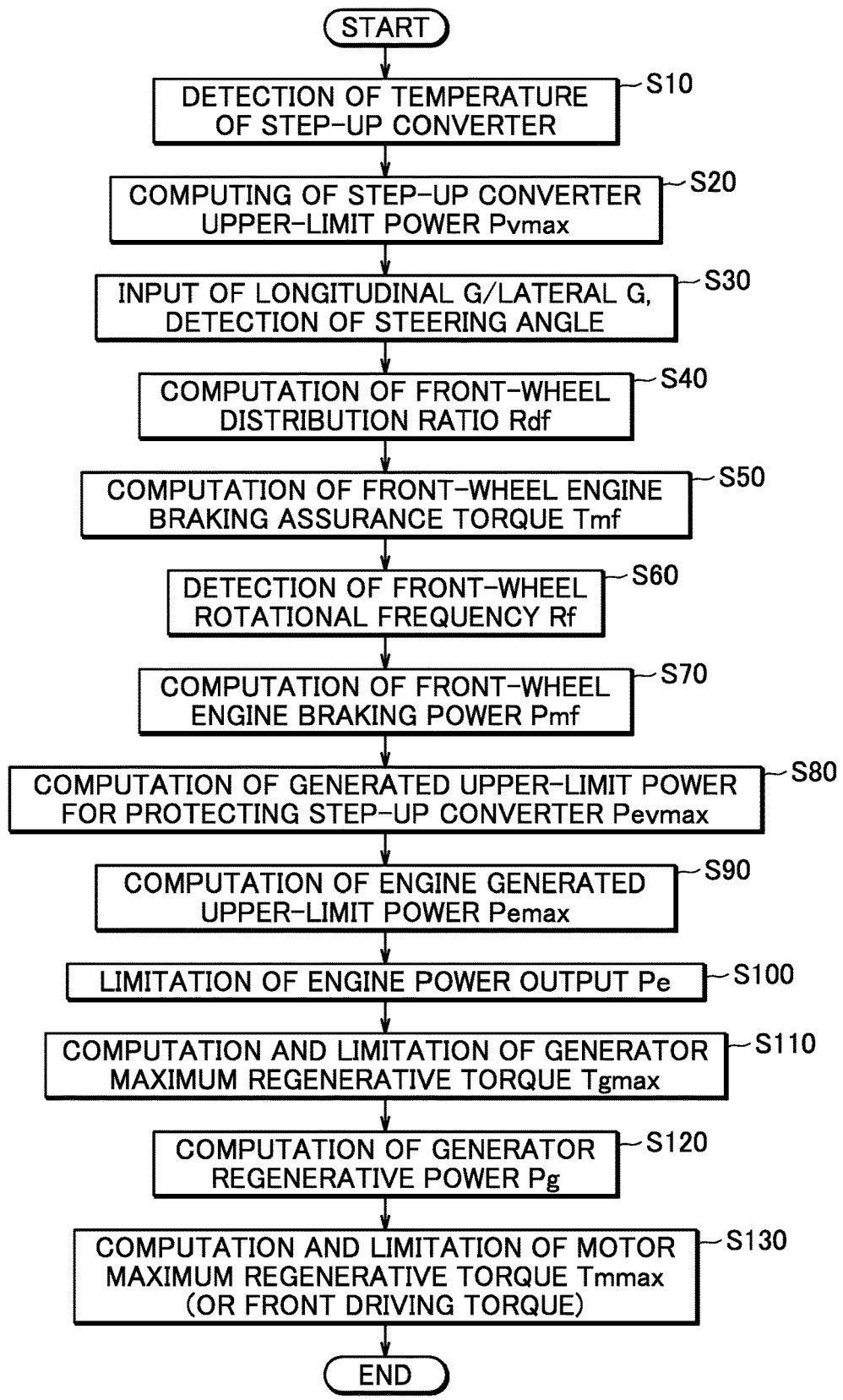
FIG. 3 is a flowchart to show a part of driving control procedure in the travel driving apparatus of the present embodiment.
Figure 4:
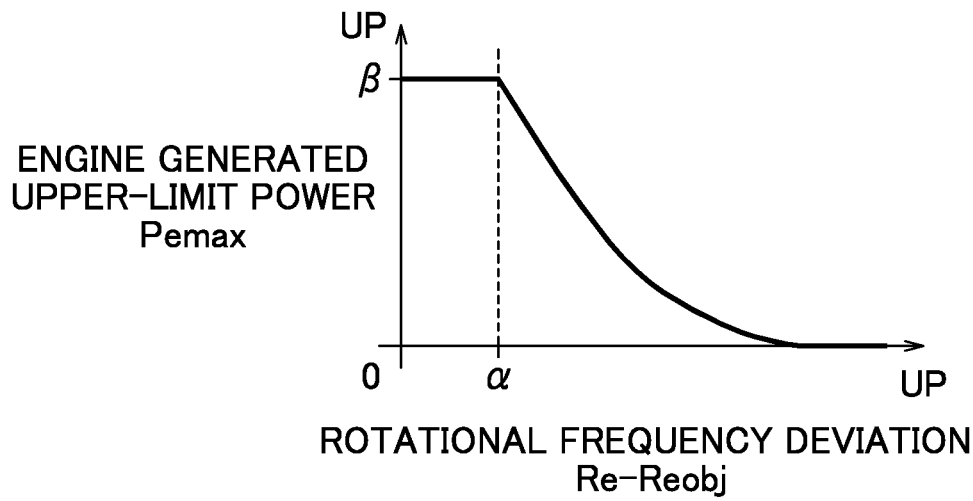
FIG. 4 is one example of a map for computing engine generated upper-limit power.

FIG. 3 is a flowchart to show the driving control procedure in the travel driving apparatus 1. FIG. 4 is one example of a map for computing engine generated upper-limit power Pemax.

The hybrid control unit 20 repeatedly executes routines of driving control shown in FIG. 3 during the series mode.

First, in step S10, a temperature of the step-up converter 15 is inputted from the temperature sensor 21. Then the process proceeds to step S20.

In step S20, a step-up converter upper-limit power Pvmax is computed based on the temperature of the step-up converter 15 which has been inputted in step S10. The step-up converter upper-limit power Pvmax is an upper limit value of power which can be inputted/outputted in the step-up converter 15. The step-up converter upper-limit power Pvmax is computed by using, for example, a pre-stored map, and setting is made such that the step-up converter upper-limit power Pvmax becomes lower as the temperature of the step-up converter 15 becomes higher. Then, the process proceeds to step S30. Note that the control of this step corresponds to the function in the above described maximum step-up input/output limit computing section 40.

In step S30, longitudinal acceleration and lateral acceleration of the vehicle are detected by the G sensor 26. Moreover, the steering angle is detected by the steering angle sensor 27. Then, these longitudinal acceleration, lateral acceleration, and steering angle are inputted. Thereafter, the process proceeds to step S40.

In step S40, a front-wheel distribution ratio Rdf is computed based on the longitudinal acceleration, lateral acceleration, and steering angle inputted in step S30. The front-wheel distribution ratio Rdf is a ratio of regenerative torque of the front wheel 2 to the regenerative torque of the entire vehicle, and control is performed to increase the front-wheel distribution ratio Rdf, for example, when straight travelling is assumed based on the lateral acceleration and the steering angle. Then, the process proceeds to step S50. Note that the control of this step corresponds to the computing section of the present invention.

In step S50, a front-wheel engine braking assurance torque Tmf is computed based on the front-wheel distribution ratio Rdf computed in step S40 and an engine braking assurance torque Tm. The front-wheel engine braking assurance torque Tmf, which is a minimum braking torque required at the front wheel 2 in regenerative braking (predetermined regenerative braking torque), is computed by Formula (1) below. Note that the engine braking assurance torque Tm is a minimum braking torque required at the entire vehicle (front wheels+ rear wheels) in regenerative braking, and is a preset value.

$$Tmf = Tm \times Rdf \quad (1)$$

Then, the process proceeds to step S60.

In step S60, the rotational frequency of the front wheel 2 (front-wheel rotational frequency Rf) is detected by the front-wheel rotational frequency sensor 22, and the front-wheel rotational frequency Rf is inputted. Then, the process proceeds to step S70.

In step S70, a front-wheel engine braking power Pmf is computed based on the front-wheel engine braking assurance torque Tmf computed in step S50 and the front-wheel rotational frequency Rf inputted in step S60. The front-wheel engine braking power Pmf, which is the generated power of the front motor 3 when regenerative braking of a front-wheel engine braking assurance torque Tmf is performed, is computed by Formula (2) below. Note that $\eta m$ is a motor efficiency.

$$Pmf = Tmf \times Rf \times \eta m \times 2\pi/60 \quad (2)$$

Then, the process proceeds to step S80. Note that the present step corresponds to the first calculating section of the present invention.

In step S80, generated upper-limit power for protecting step-up converter Pevmax is found. The generated upper-limit power for protecting step-up converter Pevmax is a value obtained by adding a larger value of the front-wheel engine braking power Pmf computed in step S70 and the motor power Pf which is the generated power of the front motor 3 by regeneration, and the step-up converter upper-limit power Pvmax computed in step S20, and taking a generation efficiency η e into account, as shown in Formula (3) below.

$$Pevmax = (Pvmax + max(Pmf, Pf(\text{previous value})))/\eta e \quad (3)$$

Then, the process proceeds to step S90.

In step S90, the engine generated upper-limit power Pemax is computed. The engine generated upper-limit power Pemax is computed based on a rotational frequency deviation between an actual rotational speed Re of the engine 6 detected by the engine rotational speed sensor 28, and a target rotational speed Reobj of the engine 6. For example, as shown in FIG. 4, as the rotational frequency deviation between an actual rotational speed Re of the engine and the target rotational speed Reobj increases, the engine generated upper-limit power Pemax is limited to be smaller. Moreover, when the rotational frequency deviation between the actual rotational speed Re and the target rotational speed Reobj is not more than α, the engine generated upper-limit power Pemax will not be limited (β in FIG. 4). Note that α of the present step is set to such a value as that generated power when the actual rotational speed Re is made to be the target rotational speed Reobj through regenerative braking by the generator 7 can be negligible. Note that control in the present step corresponds to the function of the above described generated power limit computing section 44.

Then, the process proceeds to step S100.

In step S100, as shown in Formula (4) below, the engine power output Pe is limited to be not more than a smaller value of the generated upper-limit power for protecting step-up converter Pevmax computed in step S80 and the engine generated upper-limit power Pemax computed in step S90.

$$0 \leq Pe \leq min(Pevmax, Pemax) \quad (4)$$

Then, the process proceeds to S110.

In step S110, a generator maximum regenerative torque Tgmax is computed. The generator maximum regenerative torque Tgmax is a value obtained by dividing a value which is obtained by adding a larger one of the front-wheel engine braking power Pmf computed in step S70 and the motor power Pf (previous value) to the step-up converter upper-limit power Pvmax computed in step S20 by the rotational frequency Rg of the generator 7 and taking the generator efficiency η g into account, as shown by Formula (5) below.

$$Tgmax = (Pvmax + max(Pmf, Pf(\text{previous value})))/Rg/\eta g \quad (5)$$

Further, the regenerative torque of the generator 7 is limited to be not more than the generator maximum regenerative torque Tgmax. Then, the process proceeds to step S120. Note that control of the present step corresponds to the function of the above described generator torque limit computing section 47.

In step S120, a generator regenerative power Pg is computed from the generator torque which is limited by the generator maximum regenerative torque Tgmax computed in step S110 and the generator rotational frequency. Then, the process proceeds to step S130.

In step S130, a motor maximum regenerative torque Tmmax is computed. The motor maximum regenerative torque Tmmax is supposed to be the smaller value (one of a larger negative value) of the front-wheel engine braking assurance torque Tmf computed in step S50 and a value which is obtained by dividing a value obtained by subtracting the generator regenerative power Pg computed in step S120 from the step-up converter upper-limit power Pvmax computed in step S20 by the motor rotational frequency Rm, and taking the motor efficiency η m into account, as shown in Formula (6) below.

$$Tmmax = min(Tmf, (Pvmax - Pg/Rm/\eta m)) \quad (6)$$

Note that although setting the motor maximum regenerative torque Tmmax in the present step will result in limiting the regenerative braking force, the motor maximum regenerative torque Tmmax is the maximum regenerative torque of the front motor 3 in the present embodiment.

Then, this routine is ended.

The vehicle of the present embodiment is a four-wheel driving vehicle in which the front wheels 2 can be driven by the front motor 3, and the rear wheels 4 can be driven by the rear motor 5, and which is capable of regenerative braking by the front motor 3 and the rear motor 5 during deceleration. In this situation, the hybrid control unit 20 can control these regenerative torques via the inverters 12, 13, respectively.

Further, the vehicle according to the present embodiment can operate in a series mode in which power is generated by operating the engine 6, and travel driving is performed by the front motor 3 and the rear motor 5.

The vehicle is mounted with the step-up converter 15 and is configured such that the front motor 3 is supplied with and driven by power which is supplied from the battery 8 and is stepped up in voltage by the step-up converter 15. During vehicle deceleration, generated power by the generator 7 and regenerated power by the front motor 3 pass through the step-up converter 15 to be supplied to and charge the battery 8.

Although the driving torques by the front motor 3 and the rear motor 5 become unnecessary, obviating the need of operating the engine 6 to generate power by the generator 7 when the accelerator is turned off from on in the series mode, it is possible to control the engine rotational speed corresponding to accelerator operation without uncomfortable feeling by causing the generator 7 to regenerate power thereby applying load to the engine 6, and thereby reducing the engine rotational speed at the same time the accelerator is turned off.

Therefore, when the accelerator is turned off in the series mode, there is a case in which not only the motor regenerated power but also generated power by the generator 7 is generated to reduce the engine rotational speed so that regenerated power by the front motor 3 and generated power by the generator 7 are inputted together to the step-up converter 15.

In the present embodiment, the step-up converter upper-limit power Pvmax is computed by detecting the temperature of the step-up converter 15, and by limiting the engine power output Pe, the regenerative torque of the generator 7, and the maximum regenerative torque of the front motor 3 by the driving control as shown in FIG. 3 above in the series mode, control is performed such that a total value of generated power by the generator 7 (generator regenerative power Pg) and regenerated power by the front motor 3 does not exceed the step-up converter upper-limit power Pvmax. This makes it possible to protect the step-up converter 15. Particularly, since as a result of limiting the regenerative torque of the generator 7 to the generator maximum regenerative torque Tgmax which is computed from a difference obtained by subtracting regenerated power by the front motor 3 from the step-up converter upper-limit power Pvmax, the generated power (Pg) of the generator 7 is set to a generator regenerative maximum power corresponding to the concerned generator maximum regenerative torque Tgmax, and further the regenerated power by the front motor 3 is set to be not less than the front-wheel engine braking power Pmf, it is possible to ensure the regenerative braking torque by the front motor 3, thereby suppressing idle travelling feeling of vehicle during deceleration and improving travelling stability.

Further, since the engine generated upper-limit power Pemax is computed based on a rotational frequency deviation between the actual rotational speed Re and the target rotational speed Reobj of the engine 6, and the engine power output Pe is limited so as not to exceed the engine generated upper-limit power Pemax, control is performed to regulate the power generated from the generator 7 when the engine rotational speed is controlled by turning the accelerator off, making it possible to ensure regenerative braking torque while protecting the step-up converter 15.

Figure 5:
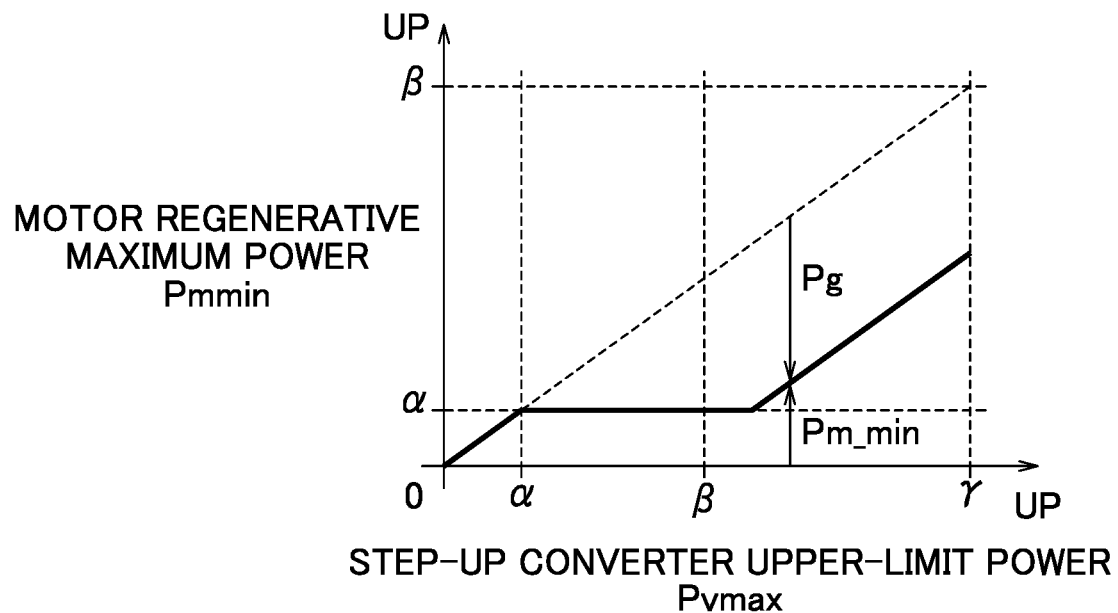
FIG. 5 is a graph to show relationship of the motor regenerative maximum power with respect to the step-up converter upper-limit power in driving control of the present embodiment.
Figure 6:
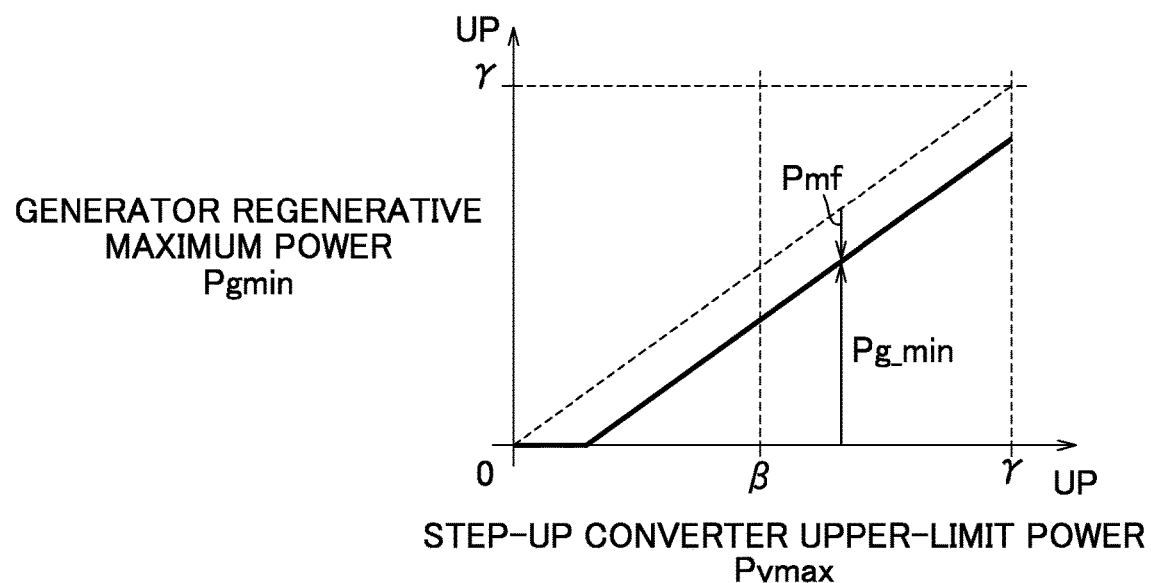
FIG. 6 is a graph to show relationship of generator regenerative maximum power with respect to the step-up converter upper-limit power in driving control of the present embodiment.

FIG. 5 is a graph to show relationship between the step-up converter upper-limit power Pvmax and the motor regenerative maximum power Pmmin in driving control of the present embodiment. FIG. 6 is a graph to show relationship between the step-up converter upper-limit power Pvmax and generator regenerative maximum power Pgmin in driving control of the present embodiment. Note that $\alpha$ in FIG. 5 indicates the front-wheel engine braking power Pmf. Also, $\beta$ in FIGS. 5 and 6 indicates continuous rated regenerative power of the step-up converter 15. Further, $\gamma$ in FIGS. 5 and 6 indicates maximum rated regenerative power of the step-up converter 15. Note that the step-up converter upper-limit power Pvmax lies between the continuous rated regenerative power $\beta$ and the maximum rated regenerative power $\gamma$ during normal operation of the step-up converter 15.

Although, in the present embodiment, the total value of the generated power by the generator 7 and the regenerated power by the front motor 3 is controlled so as not to exceed the step-up converter upper-limit power Pvmax by the above described travel driving control, the motor regenerative maximum power Pmmin, which is a maximum value of the regenerated power by the front motor 3, will have a value not less than $\alpha$ (front-wheel engine braking power Pmf) during normal operation between the continuous rated regenerative power $\beta$ and the maximum rated regenerative power $\gamma$ as shown in FIG. 5. Further, as the generator regenerative power Pg decreases or the step-up converter upper-limit power Pvmax increases, the motor regenerative maximum power Pmmin increases.

Further, as shown in FIG. 6, during normal operation between the continuous rated regenerative power $\beta$ and the maximum rated regenerative power $\gamma$, although the generator regenerative maximum power Pgmin increases as the step-up converter upper-limit power Pvmax increases, the regenerated power of the front motor 3 will be ensured to be not less than a predetermined value (Pmf).

As so far described, in the present embodiment, the generator torque Tg is limited by setting the generator maximum regenerative torque Tgmax according to the step-up converter upper-limit power Pvmax when the accelerator is turned off from on (during vehicle deceleration) in the series mode. As a result of this, generated power by the generator 7 is limited, making it possible to ensure regenerated power by the front motor 3. Therefore, the regenerative braking torque of vehicle, particularly regenerative braking torque of the front wheels 2 can be ensured, making it possible to suppress the occurrence of idle travelling feeling of vehicle during deceleration, and improve travelling stability of vehicle.

Further, since the front-wheel distribution ratio Rdf, which is computed in step S40 described above, is set to be not less than 50% (0.5), it is possible to ensure the regenerative braking torque of the front wheels 2 during regenerative braking, thus improving vehicle travel stability during deceleration.

Further, the front-wheel distribution ratio Rdf may be corrected according to the step-up converter upper-limit power Pvmax and travelling conditions. For example, the front-wheel distribution ratio Rdf may be decreased as the step-up converter upper-limit power Pvmax decreases, or the travelling stability deteriorates.

Figure 7:
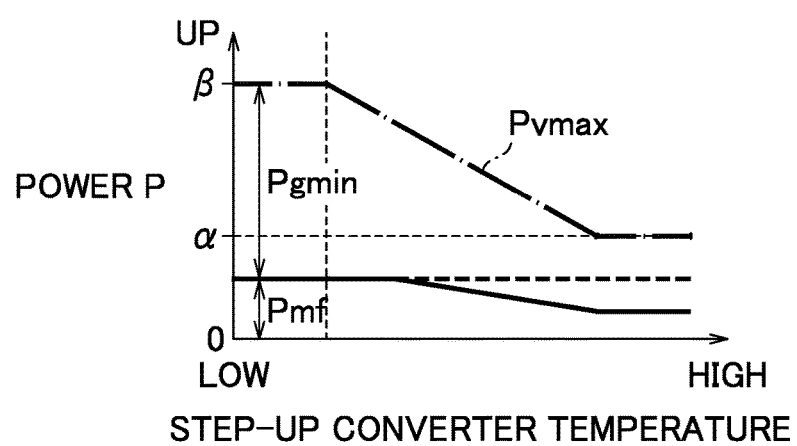
FIG. 7 is a graph to show proportion between front-wheel engine braking power and the generator regenerative maximum power at step-up converter upper-limit power corresponding to temperature of the step-up converter.

FIG. 7 is a graph to show proportion between front-wheel engine braking power Pmf and the generator regenerative maximum power Pgmin at step-up converter upper-limit power Pvmax corresponding to temperature of the step-up converter 15. In the figure, a chain line indicates the step-up converter upper-limit power Pvmax, and a broken line and a solid line indicate the front-wheel engine braking power Pmf. The broken line indicates a case in which the front-wheel engine braking power Pmf is kept constant without correction of the front-wheel distribution ratio Rdf, and the solid line indicates a case in which the front-wheel distribution ratio Rdf is corrected so at to be decreased as the temperature of the step-up converter 15 becomes higher. Note that the generator regenerative maximum power Pgmin is a value obtained by subtracting the front-wheel engine braking power Pmf from the step-up converter upper-limit power Pvmax.

As shown by the chain line of FIG. 7, the step-up converter upper-limit power Pvmax decreases as the temperature of the step-up converter 15 increases from a predetermined temperature or above. As shown by the broken line, since the front-wheel engine braking power Pmf is constant without correction of the front-wheel distribution ratio Rdf, the generator regenerative maximum power Pgmin decreases if the step-up converter upper-limit power Pvmax significantly decreases when the temperature of the step-up converter 15 rises. As shown by the solid line, by performing correction to decrease the front-wheel distribution ratio Rdf as the temperature of the step-up converter 15 rises, it is made possible to decrease the front-wheel engine braking power Pmf, thereby increasing the generator regenerative maximum power Pgmin. This makes it possible to rapidly decrease the engine rotational frequency when the accelerator is turned off.

Note that although decreasing the front-wheel engine braking power Pmf will decrease the regenerative braking torque of the front wheels 2, it is possible to increase the regenerative braking torque of the rear wheels 4 by correcting the front-wheel distribution ratio Rdf, thereby ensuring regenerative braking torque as the entire vehicle.

Moreover, such correction of the front-wheel distribution ratio Rdf may be performed regularly or, for example, performed only during a period other than turn travelling. By performing correction of the front-wheel distribution ratio Rdf only during turn travelling, it is possible to suppress increase in the regenerative braking torque of the rear wheel 4 during regenerative braking in turn travelling, thereby suppressing deterioration of straight travelling stability of vehicle.

Note that the present invention will not be limited to the above described embodiments. The present invention can be widely applied to hybrid vehicles which are equipped with a step-up converter and perform regenerative braking.

What is claimed is:

1. A travel driving apparatus of a vehicle, comprising:
   a transformer of which maximum input/output power is changed based on a temperature condition;
   a first electrical motor regenerating power by rotational force of either one of a front wheel and a rear wheel of the vehicle, and causing the power to be transformed by the transformer and to be supplied to a battery;
   a generator generating power by being driven by an internal combustion engine and causing the power to be transformed by the transformer and to be supplied to the battery;
   an engine controller that controls the internal combustion engine;
   a hybrid controller including a processor and a storage storing a program that causes the processor to:
   calculate, as a first calculator, regenerated power of the first electrical motor such that regenerative braking torque not less than a predetermined level is exerted at the either one of the wheels of the vehicle; and
   calculate, as a second calculator, generated power of the generator, wherein
   the second calculator sets a difference obtained by subtracting the regenerated power calculated at the first calculator from the maximum input/output power of the transformer that changes based on the temperature condition as maximum generated power of the generator,
   wherein the hybrid controller drives the first electric motor based on the calculated regenerated power, and the engine controller drives the internal combustion engine so the generator generates power based on the set difference, such that a total of the regenerated power of the first motor and the generated power of the generator is input to the transformer to prevent the total power input to the transformer from exceeding the maximum input/output power.

2. The travel driving apparatus of the vehicle according to claim 1, further comprising:
   a detecting section for detecting actual rotational speed of the internal combustion engine,
   wherein the program causes the processor to:
   set a target rotational speed of the internal combustion engine, and
   the second calculator calculates the generated power such that the generated power is not more than the maximum generated power based on deviation between the target rotational speed and the detected actual rotational speed.

3. The travel driving apparatus of the vehicle according to claim 2, wherein
   the second calculator calculates such that the generated power decreases as the deviation between the target rotational speed and the detected actual rotational speed increases.

4. The travel driving apparatus of the vehicle according to claim 1, further comprising:
   a second electrical motor regenerating power by rotational force of the other one of the front wheel and the rear wheel of the vehicle, and supplying the power to a battery not via the transformer,
   wherein the program causes the processor to:
   compute a distribution ratio between regenerative torque of the first electrical motor and regenerative torque of the second electrical motor, and
   correct regenerative torques of the first electrical motor and the second electrical motor based on temperature of the transformer so that regenerative braking torque not less than a predetermined level is generated at the first electrical motor and the second electrical motor.

5. The travel driving apparatus of the vehicle according to claim 2, further comprising:
   a second electrical motor regenerating power by rotational force of the other one of the front wheel and the rear wheel of the vehicle, and supplying the power to a battery not via the transformer,
   wherein the program causes the processor to:
   compute a distribution ratio between regenerative torque of the first electrical motor and regenerative torque of the second electrical motor, and
   correct regenerative torques of the first electrical motor and the second electrical motor based on temperature of the transformer so that regenerative braking torque not less than a predetermined level is generated at the first electrical motor and the second electrical motor.

6. The travel driving apparatus of the vehicle according to claim 3, further comprising:
   a second electrical motor regenerating power by rotational force of the other one of the front wheel and the rear wheel of the vehicle, and supplying the power to a battery not via the transformer,
   wherein the program causes the processor to:
   compute a distribution ratio between regenerative torque of the first electrical motor and regenerative torque of the second electrical motor, and
   correct regenerative torques of the first electrical motor and the second electrical motor based on temperature of the transformer so that regenerative braking torque not less than a predetermined level is generated at the first electrical motor and the second electrical motor.

7. The travel driving apparatus of the vehicle according to claim 4, wherein
   the program causes the processor to:
   decrease regenerative torque generated at the first electrical motor as temperature of the transformer becomes higher.

8. The travel driving apparatus of the vehicle according to claim 5, wherein
   the program causes the processor to:
   decrease regenerative torque generated at the first electrical motor as temperature of the transformer becomes higher.

9. The travel driving apparatus of the vehicle according to claim 6, wherein
   the program causes the processor to:
   decrease regenerative torque generated at the first electrical motor as temperature of the transformer becomes higher.

* * * * *